2 Sheets—Sheet 1.

W. WELBOURNE,

Assignor to E. CHEETHAM.

TEA CANISTER.

No. 9,789. Reissued July 5, 1881.

Attest,
Geo. H. Graham.
John Boleschka.

Inventor,
Wm. Welbourne,
by Munson & Philipp
Attys.

N. PETERS, Photo-Lithographer, Washington, D. C.

W. WELBOURNE,

Assignor to E. CHEETHAM.

TEA CANISTER.

No. 9,789. Reissued July 5, 1881.

Attest,
Geo. H. Graham
John Boleschka

Inventor,
Wm Welbourne,
by Munson & Philipp
Attys.

N. PETERS, Photo-Lithographer, Washington, D. C.

UNITED STATES PATENT OFFICE.

WILLIAM WELBOURNE, OF PRESTON, COUNTY OF LANCASTER, GREAT BRITAIN, ASSIGNOR TO EDWARD CHEETHAM, OF CHICAGO, ILLINOIS.

TEA-CANISTER.

SPECIFICATION forming part of Reissued Letters Patent No. 9,789, dated July 5, 1881.

Original No. 65,849, dated June 18, 1867. Application for reissue filed October 9, 1880. Patented in England, June 25, 1866.

*To all whom it may concern:*

Be it known that I, WILLIAM WELBOURNE, of Preston, Great Britain, have invented certain Improvements in Canisters for Tea, &c.; and I do hereby declare the following to be a full, clear, and exact description of the same, reference being had to the accompanying drawings, and to the letters of reference marked thereon.

My invention is designed for the purpose of preventing the accumulation of tea-dust or similar deposits, and also for enabling the attendant to take tea from the canister without touching it with the hand or removing the canister from the shelf; and the invention consists in a canister provided with one or more compartments for containing tea, &c., and a space or chamber beneath the same, into which the contents may fall, and from which they may be removed, and also in details of construction, all to be now fully described.

Figure 1:
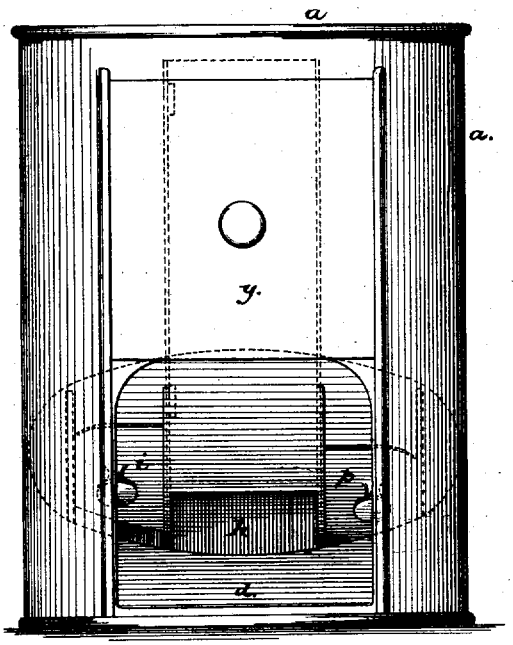
Figure 2:
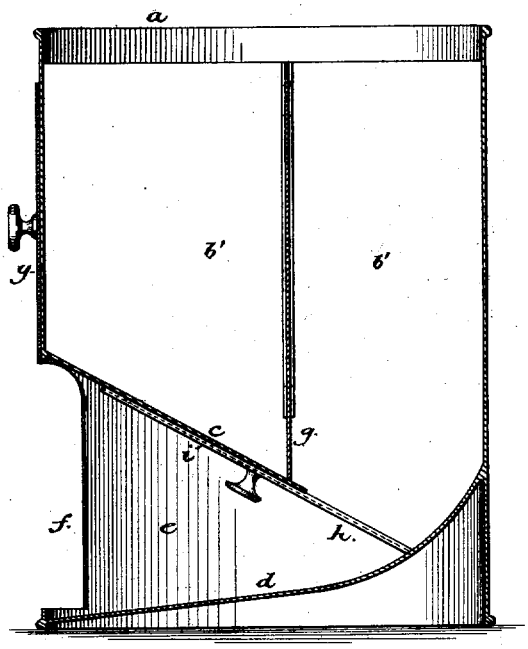
Figure 3:
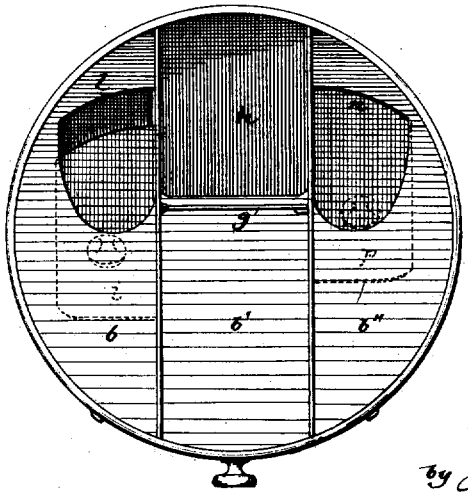
Figure 4:
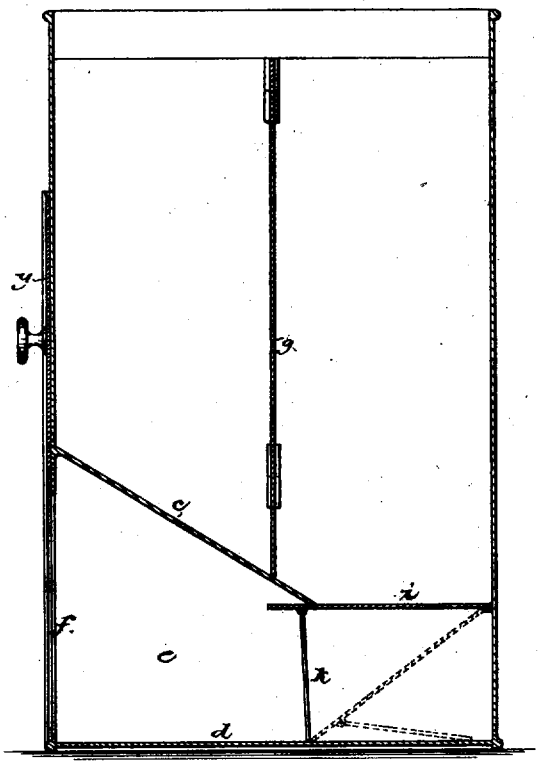
Figure 5:
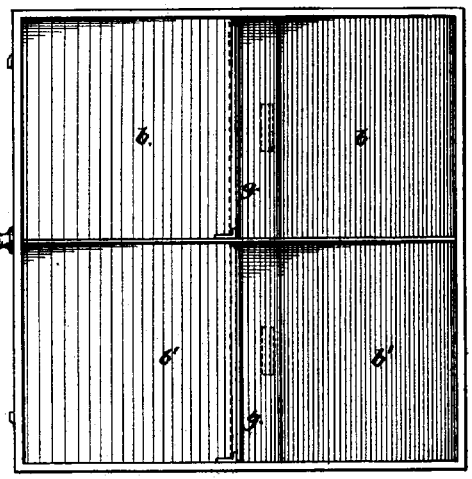

In the drawings, Figure 1 represents a front view, shown in elevation, of one form of canister embodying my invention. Fig. 2 represents a side vertical section of the same. Fig. 3 represents a plan view of the same. Fig. 4 represents a modification of the canister shown in Figs. 1, 2, and 3. Fig. 5 represents a plan view of the same.

In Figs. 1, 2, and 3, *a* represents a canister, shown open at the top and provided with a bottom, *d*. This canister, as shown, is divided into compartments *b b′ b″* by partitions extending from the top of the canister to a slanting platform, *c*, which is securely placed inside the canister at a small distance above the bottom *d*, leaving a space or chamber, *e*, beneath the platform *c*, and between it and the bottom *d*, conveniently large to allow a small scoop to be inserted therein through an opening, *f*, which may be closed by a sliding door, *y*, or a swinging door. The middle compartment, *b′*, of this canister is provided with a swing-door, *g*, which, when closed, divides the said compartment in two. In the platform *c* are openings *l h n*, those *l* and *n* capable of being closed by sliding doors *i* and *p*, with which said platform is provided, and which can be withdrawn, so as to allow clear or open passages from the compartments *b b″* through said platform into the space or chamber *e*, while the rear of the compartment *b′* has a clear or open passage through the opening *h* into the space or chamber *e*.

When the canister *a* is filled with tea, the swing-door *g* being closed, the tea is discharged from the back part of compartment *b′* through the opening *h* into the space or chamber *e*, and is withdrawn therefrom by a scoop; and as soon as the back portion of said compartment is empty, the weight of the tea in the front part of said compartment forces open the door *g*, thereby effecting a communication for discharging through the same passage or opening *h* into the space or chamber *e*. The side compartments, *b b″*, are severally emptied in like manner when the doors *i p* are withdrawn, so as to allow open passages between the said compartments and the space or chamber *e*.

As shown in Figs. 4 and 5, the canister is square in form, open at the top, and provided with a bottom, *d*. It is internally divided into two compartments, *b b′*, the divisions extending from the top of the canister to a slanting platform, *c*, which is placed inside the canister *a* at a small distance above the bottom *d*, forming a chamber, *e*, between said platform and bottom, conveniently large to allow a small scoop to be inserted therein through an opening, *f*, which may be closed by a sliding door, *y*. The compartments *b b′* are provided with swing-doors *g*, each of which, when closed, divides its respective compartments in two. The platform *c* is shorter than the width of the canister, thus leaving openings capable of being closed by a door, *i*, pivoted to the back of the canister, and supported, when closed, by a leg, *k*. The tea is prevented from falling into the space *e* by this door *i* when the latter is supported by the leg *k*; but when let down a passage is opened between the compartments of the canister and the space *e*, into which the tea falls. If the platform *c* were inclined from the sides to the center, both compartments might be discharged through one central aperture, into which the scoop is inserted.

The discharge of tea from the several compartments in the space or chamber *e* of the canister, as described, is regulated according to the quantity withdrawn from the space or chamber *e* by the scoop.

Having thus described my invention, what I claim as new, and desire to secure by Letters Patent, is—

1. A canister provided with one or more compartments, and with a space or chamber beneath the same, into which the contents of said compartments may fall, and from which they may be removed, substantially as described.

2. A canister provided with one or more compartments, and with a space or chamber beneath the same, into which the contents of said compartments may fall, and from which they may be removed, and means for cutting off the passage between said compartment or compartments and chamber, substantially as described.

3. A canister provided with a compartment or compartments, a chamber beneath the same, and a door to close said chamber, substantially as described.

4. A canister having divisions and doors arranged and operating in the manner and for the purpose described.

In witness whereof I have hereunto signed my name to this specification in the presence of two subscribing witnesses.

WM. WELBOURNE.

Witnesses:

CHARLES T. TAYLOR,
*Solicitor, Preston, Lancashire.*

JOHN WHITTLE,
*His Clerk.*